(12) United States Patent
Masar et al.

(10) Patent No.: US 6,700,503 B2
(45) Date of Patent: Mar. 2, 2004

(54) METHOD OF COMMUNICATING CONDITIONS WITHIN A STORAGE TANK LEVEL

(75) Inventors: Lubomir Masar, Katy, TX (US); Gerald T. Boylan, Austin, TX (US)

(73) Assignee: Siemens Energy & Automation, INC, LaPorte, TX (US)

( * ) Notice: Subject to any disclaimer, the term of this patent is extended or adjusted under 35 U.S.C. 154(b) by 124 days.

(21) Appl. No.: 10/017,956

(22) Filed: Dec. 14, 2001

(65) Prior Publication Data

US 2003/0028336 A1 Feb. 6, 2003

Related U.S. Application Data

(60) Provisional application No. 60/310,308, filed on Aug. 6, 2001.

(51) Int. Cl.$^7$ ................................................ G01F 23/00
(52) U.S. Cl. ................... 340/870.01; 73/302; 73/314
(58) Field of Search ........................ 340/870.01, 618, 340/870.02; 73/313, 302; 702/188

(56) References Cited

U.S. PATENT DOCUMENTS

| | | | |
|---|---|---|---|
| 4,487,065 A | 12/1984 | Carlin et al. | |
| 4,625,553 A | 12/1986 | Charter | |
| 4,744,247 A | 5/1988 | Kaminski | |
| 4,747,062 A | 5/1988 | Esau | |
| 4,845,486 A | 7/1989 | Knight et al. ................ 340/618 |
| 4,853,694 A | 8/1989 | Tomecek | |
| 4,856,343 A | 8/1989 | Hon | |
| 5,056,017 A | 10/1991 | McGarvey | |
| 5,069,068 A | 12/1991 | Jacob et al. | |
| 5,090,242 A | * 2/1992 | Hilton ........................... 73/302 |
| 5,133,212 A | 7/1992 | Grills et al. | |
| 5,319,964 A | 6/1994 | Stephenson et al. ........... 73/149 |
| 5,351,235 A | 9/1994 | Lahtinen ..................... 370/58.1 |
| 5,379,638 A | 1/1995 | Denz et al. | |
| 5,432,507 A | 7/1995 | Mussino et al. | |
| 5,572,445 A | 11/1996 | Shook et al. | |
| 5,619,560 A | 4/1997 | Shea | |
| 5,689,248 A | 11/1997 | Esfahani et al. | |
| 5,705,747 A | 1/1998 | Bailey ......................... 73/290 |
| 5,708,424 A | 1/1998 | Orlando et al. ........ 340/870.08 |
| 5,838,258 A | 11/1998 | Saar | |
| 5,892,758 A | * 4/1999 | Argyroudis ................. 370/335 |
| 5,986,574 A | * 11/1999 | Colton ................... 340/870.02 |
| 6,034,623 A | 3/2000 | Wandel | |
| 6,064,311 A | * 5/2000 | Ferenczi et al. ............. 340/618 |
| 6,065,335 A | 5/2000 | Denz et al. | |
| 6,336,362 B1 | * 1/2002 | Duenas ........................ 73/313 |
| 6,553,336 B1 | * 4/2003 | Johnson et al. ............. 702/188 |

OTHER PUBLICATIONS

International Search Report.

\* cited by examiner

*Primary Examiner*—Michael Horabik
*Assistant Examiner*—Hung Q Dang
(74) *Attorney, Agent, or Firm*—José R. de la Rosa

(57) ABSTRACT

A system for monitoring the conditions within a storage tank includes a sensor communicating data indicative of conditions within the storage tank to a base controller. The data is decoded and arranged into a graphical display of the conditions of the storage tank. The graphical display includes a representation of storage tank conditions including the configuration of the storage tank, current fluid levels and temperature within the storage tank. The graphical display also includes a historical database of conditions within the storage tank that may be displayed graphically to track usage. The base controller is connected to a communications network such that data indicative of conditions with the storage tank can be communicated to remote users through a wireless communication network by way of alphanumeric messages.

25 Claims, 3 Drawing Sheets

METHOD OF COMMUNICATING CONDITIONS WITHIN A STORAGE TANK LEVEL

This application claims priority to the provisional application serial No. 60/310,308, filed on Aug. 6, 2001.

BACKGROUND OF THE INVENTION

This invention relates to a system and method of monitoring and communicating data indicative of conditions within a storage tank.

Fluids such as heating fuel oil and gasoline are stored in storage tanks located near a point of use. Typically, a utility provider maintains a fleet of trucks to periodically refill these storage tanks before the storage tank becomes completely empty. Utility providers attempt to predict the usage of fuel stored within the storage tank in an effort to efficiently utilize its fleet of tank trucks. However, inconsistent usage patterns make the use of a simply periodic schedule of storage tank refill inefficient. Typically, the use of heating oil is dependent on temperature and may vary dramatically between locations. Further, the use of predictive algorithms to determine when to make a delivery is imprecise. These factors make it desirable to monitor each storage tank so that a tank truck can be dispatched to refill a specific storage tank according to need, instead of an inaccurate and inefficient standard schedule.

Storage tank monitoring systems currently in use include a sensor disposed within a storage tank that measures the level of fluid and temperature within the storage tank. The sensor transmits data through a communication network to a base controller. Typically, the base controller is a computer that decodes and stores the data using specialized software. The information received by the base controller provides for the monitoring of each specific storage tank individually. This allows for the delivery of fuel or other fluids to the storage tank on an as needed basis. Such monitoring systems increase the efficiencies of the utility supplier as well as the user of fluids within the storage tanks. However, the data received from the sensor by the base controller can be confusing and require much time to decode and format into a useful form. Further, remotely located users cannot readily access data concerning conditions within the storage tank stored at the base controller.

For these reasons it is desirable to design a system of monitoring conditions within a storage tank that provides for ease of monitoring and can forward data to users at remote locations.

SUMMARY OF THE INVENTION

This application discloses a system for monitoring the conditions within a storage tank by providing a graphical representation of each storage tank to a user by transmitting data indicative of storage tank conditions over a communications network to a remotely located display device.

The system includes a tank level sensor mounted within the storage tank that includes a cellular modem. The cellular modem receives signals from a base controller connected to a communications network. Preferably, the base controller is a personal computer in communication with the sensor by way of a modem connection. Upon receipt of the signal from the base controller, the sensor transmits data about conditions within the storage tank. The data transmitted from the sensor includes information about fluid level and temperature within the storage tank. The base controller receives and decodes this data from the sensor and stores the decoded data in a database.

A graphical representation displays the conditions within the storage tank based on the data stored in the database. The graphical representation illustrates the fluid level within a storage tank of the specific configuration such as a vertical or horizontally orientated storage tank. The graphical display provides information on the current volume of fluid and the available volume within the storage tank. The graphical display also shows maximum and minimum alarm levels within the storage tank. Further, the graphical display includes a graph of historical fluid and temperature levels along with a table including the data history for the storage tank.

The sensors transmit data to the base controller when prompted by a signal initiated by a user or according to either 1) a manually triggered dial-up or 2) an automatic polling schedule. The automatic polling schedule defines the time and frequency in which to prompt the sensors to transmit data concerning conditions within the storage tank. The automatic polling schedule provides for the automatic accumulation of data without the need for a user to initiate data collection.

Information concerning conditions within the storage tank may be forwarded through a communications network to a remote user. In one feature of this invention, data is forwarded through a wireless communications network to a cellular phone in the form of an alphanumeric message. The wireless transmission allows for the receipt of data about conditions within the storage tank according to a predefined schedule such that a remotely located user can continuously receive information concerning specific storage tanks.

The system for monitoring conditions within a storage tank provides for easy monitoring of data, and for the automatic gathering of information concerning storage tank conditions. Further, the system provides for the forwarding of data to a remotely located user in the form of short text messages received by a cellular phone.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
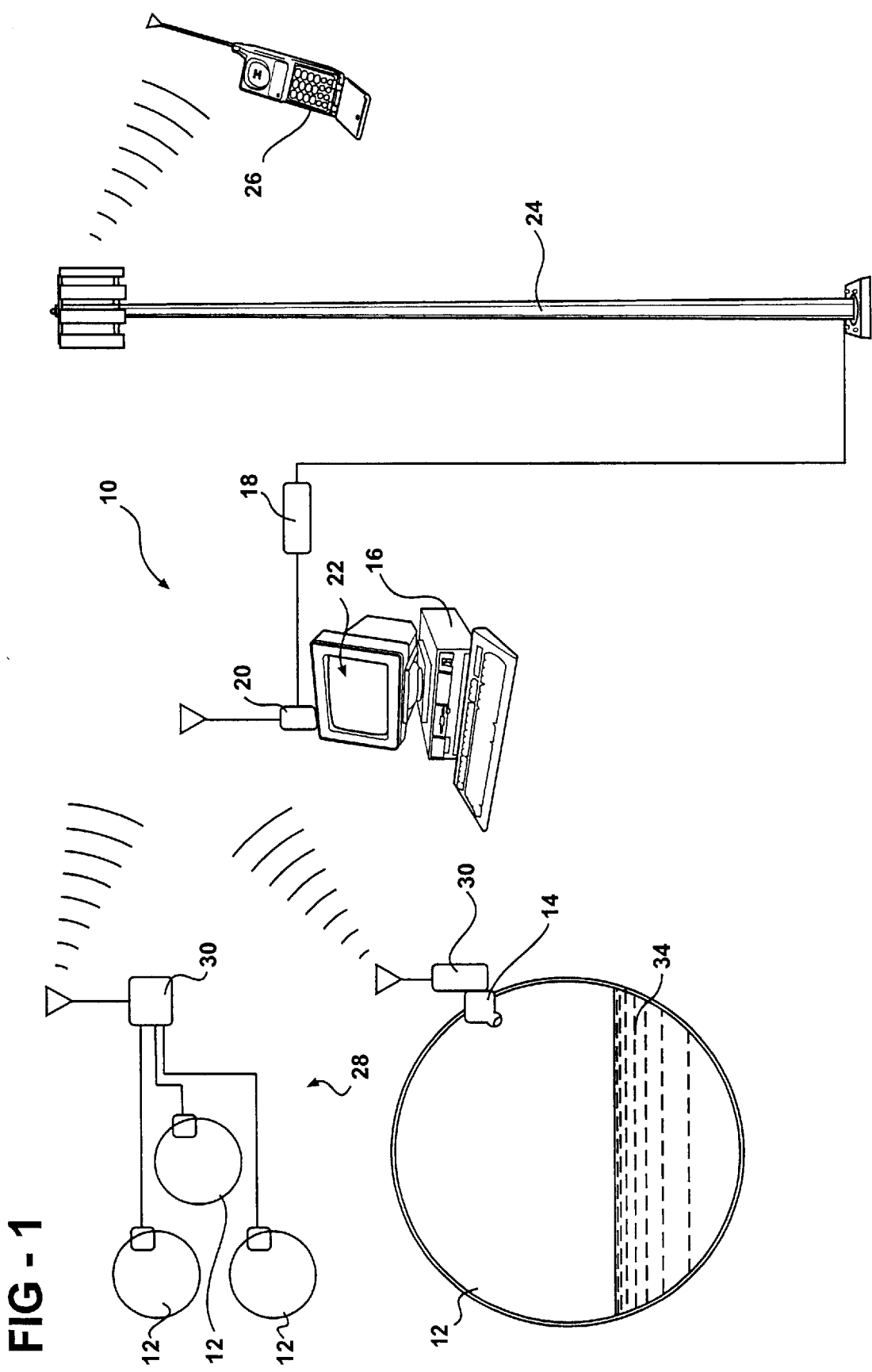
FIG. 1 is schematic view of a system for monitoring storage tank conditions.

A system for monitoring the conditions within a storage tank is schematically illustrated at 10 in FIG. 1. The system 10 monitors conditions within many predefined storage tanks 12 having many different configurations. The schematic illustration in FIG. 1 shows a plurality of storage tanks 12 located within close proximity to each other in a defined storage tank area 28. The system 10 includes a sensor 14 that communicates data indicative of conditions within the storage tank to a base controller 16. The base controller 16 is preferably a personal computer in communication with a communications network 18 by way of a modem 20. The type of personal computer and modem can be of any type known to one knowledgeable in the art. The base controller 16 receives, decodes and stores data from the sensor 14. The base controller 16 displays a graphical representation of the data received from the sensor 14 for viewing by a user. Further, data may be transmitted through a communication network 18 for viewing by other remotely located users. Preferably, the communications network 18 includes a wireless cellular network 24 such that a remotely located user may receive data in the form of alphanumeric messages with a cellular phone 26.

The storage tanks 12 are located individually, or in storage tank areas, 28 including multiply storage tanks 12 located in close proximity to one another. In either of the arrangements, each storage tank 12 includes a sensor 14. Individually located storage tanks 12 include a single cellular modem 30 for communication with the base controller 16. A single cellular modem 30 communicates with the sensors 14 for each individual storage tank 12 arranged in a storage tank area 28 such that a single cellular modem 30 transmits data from all of the storage tanks 12 within any particular storage tank area 28. Preferably, the sensor 14 collects data on the temperature and fluid level within the storage tank 12. It is within the contemplation of this invention to use any type of sensor 14 and cellular modem 30 known to one skilled in the art.

The configuration of each individual storage tank 12 is defined before monitoring conditions within the storage tank 12. The definition of each storage tank 12 is defined and stored at the base controller 16. Definition of each storage tank 12 includes the steps of defining the physical characteristics of the storage tank, such as whether the storage tank 12 is a vertical or horizontal storage tank 12. Definition of the storage tank 12 further includes defining the capacity of the storage tank 12. Definition of storage tank capacity may be provided by defining the physical height and width dimensions of the storage tank 12 and then utilizing such information to determine the volumetric capacity of the storage tank. Alternatively, the known volumetric capacity of a storage tank may be defined directly. Further definition of the storage tank includes the setting of specific alarm levels that will indicate a maximum or minimum fluid level and corresponding graphic element of the tank representation will be flashing when the fluid level exceeds the high alarm level or falls below the low alarm level.

Preparation for monitoring of the storage tank 12 includes the assignment of a unique identifier used to recall the specific storage tank definition displayed upon the receipt of data. Selection of a storage tank identifier displays the graphical representation of the storage tank. The sensor 14 is prompted by an instruction from a user at the base controller 16. In response to the prompt from the base controller 16, the sensor 14 transmits data indicative of current conditions within the storage tank 12. Such data typically includes the level and temperature of fluid within the storage tank 12. Data received at the base controller 16 is decoded and stored in a database corresponding to the specific storage tank 12. From the fluid level, temperature data, and the defined storage tank 12 characteristics, various other information is derived concerning conditions within the storage tank 12. These include the volume of fluid within the storage tank 12, available capacity within the storage tank 12, percentage of capacity currently used along with proximity of the fluid level to maximum and minimum alarm levels.

Figure 2:
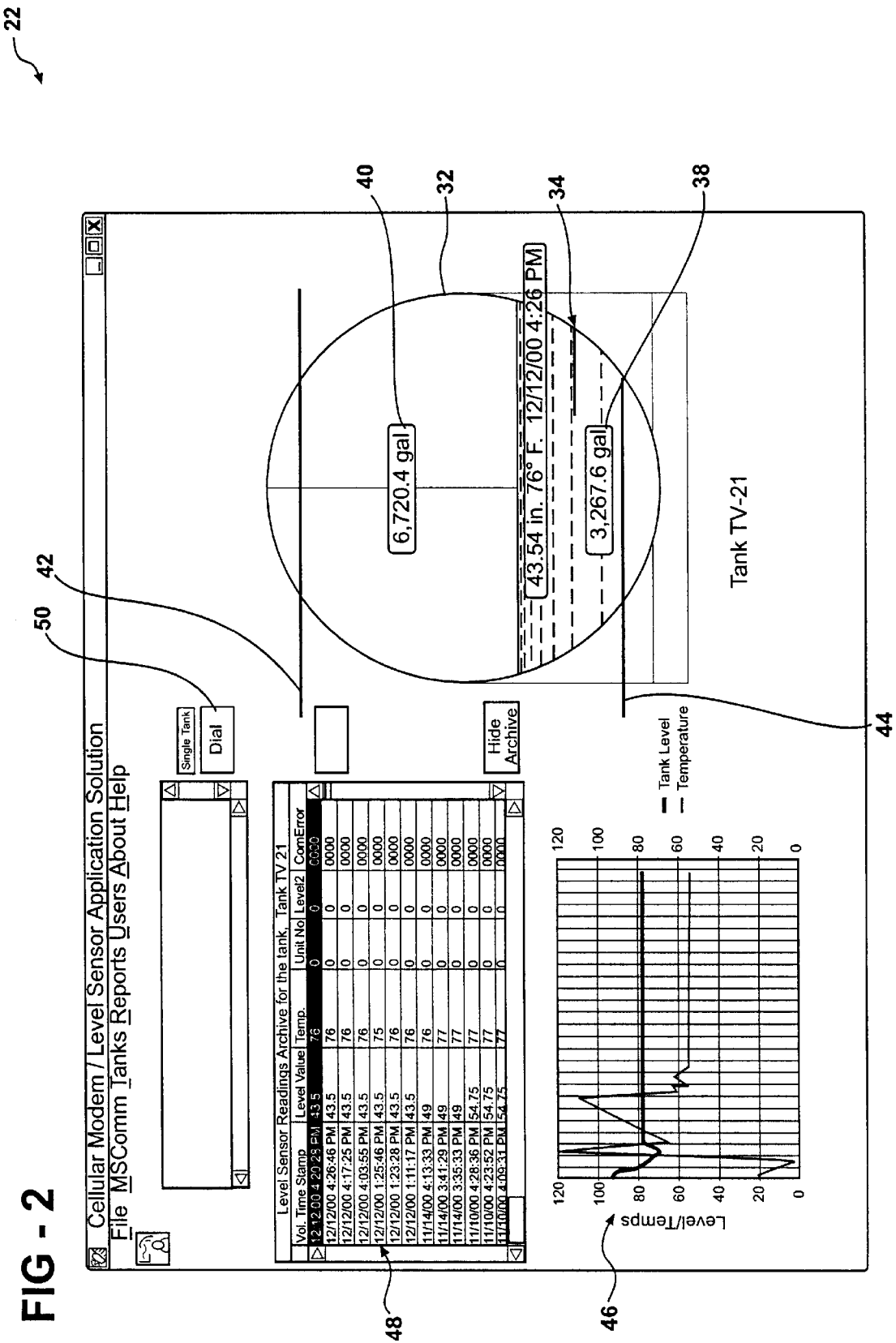
FIG. 2 is the graphical representation of storage tank conditions.

Referring to FIGS. 1 and 2, data from the sensors 14 are arranged into a graphical display 22 for viewing by the user. The base controller 16 is programmed to arrange the fluid level and temperature data into the graphical display 22. A worker knowledgeable in the art would understand how to program the base controller to construct the graphical display 22. The graphical display 22 includes a graphical representation of the physical configuration of the storage tank 12 such as the horizontal tank shown in FIG. 2. Other configurations of storage tanks may be displayed depending on each storage tanks individual physical configuration. The representation of the horizontal tank 22 includes a shaded region 34 representing the current level of fluid within the storage tank 12. Above the shaded region is a non-shaded region 36 representing the non-filled portion of the storage tank 12. Numeric values 38, 40 of the volume in both the shaded and non-shaded region determined from the level of fluid and tank configuration are displayed to the user on the graphical representation 22 of the storage tank 12. The volume of fluid within each of the regions is determined by use of the predefined physical dimensions of the storage tank 12. A worker skilled in the art would understand that with the fluid level information transmitted from the sensor 14, and specific dimensions of the specific storage tank that the volume of fluid can be determined utilizing the preprogrammed base controller 16. Also displayed are the temperature and the exact time data concerning conditions within the storage tank 12 was taken. The upper and lower lines 42, 44 drawn across the tank represent the minimum and maximum alarm levels.

Beside the graphical representation of the storage tank is a graph 46 illustrating fluctuations in temperature and Fluid level over a specified time. Above the graph 46 is a table 48 of the data stored within the database. A worker skilled in the art would understand how to program the base controller 16 to display a graph 46 of data. The graph 46 can be arranged to display the historical fluctuation of any of the data parameters displayed concerning the storage tank 12. A dial prompt 50 initiates an update of the graphical representation 22 by prompting the sensor 14 to transmit data indicative of current conditions within the storage tank 12.

The system 10 includes an automatic data gathering or polling feature that automatically prompts the sensor 14 to transmit data based on a predetermined polling schedule. The polling feature allows a user to define specific times for the base controller 16 to issue the command prompt and receive data from the sensor 14. The polling feature allows for the automatic collecting of data without the user prompting the sensor 14 to transmit data. In this way, the storage tank 12 is polled based on a predefined daily schedule. The data is subsequently decoded and stored for viewing by the user. The polling schedule can be defined such that data indicative of the conditions within the storage tank 12 is gathered as often as desired. Preferably, data from conditions within the storage tank would be taken early in the day and again later in the day, such that daily usage can be determined, and further usage predicted based on prior usage.

The automatic polling feature will simply store the data for future viewing by a user at the base controller 16 or can format the data for transmission through a communications network 18 to a remote user. In the preferred embodiment, the sensor 14 is prompted according to the predefined polling schedule to transmit data indicative of conditions within the storage tank 12. The data indicative of current conditions within the storage tank 12 is in turn formatted by the base controller 16 for transmission through the communications network 18 to a remote user. Preferably, the communications network 18 includes an Internet connection to an electronic mail address. Data of current storage tank conditions can thereby be gathered and sent to a remote user by way of the Internet to provide substantially real time data on any storage tank 12.

Data sent by electronic mail may be forwarded by way of a wireless communications network 24 to a cell phone 26 as a short text message. Preferably, data indicative of storage tank conditions is sent to an electronic mail address corresponding to the short text message service of the remote user's cell phone 26. The data sent to the remote cell phone 26 is an abbreviated version of the data contained in the graphical display 22 viewed at the base controller 16. Preferably, the alphanumeric message sent to the cell phone 26 includes the numeric value of the volume of fluid within the storage tank 12, temperature of fluid within the storage tank and the time data was taken. Other data about the storage tank 12, such as the numeric identifier and location may also be forwarded to the cell phone 26. Further, a worker skilled within the art would understand that many variations of data formats may be sent to the remote user by way of the cell phone 26. Receiving storage tank data by way of a user's cell phone 26 provides substantially real time storage tank information at virtually any location in the world without the need for a portable computer.

Figure 3:
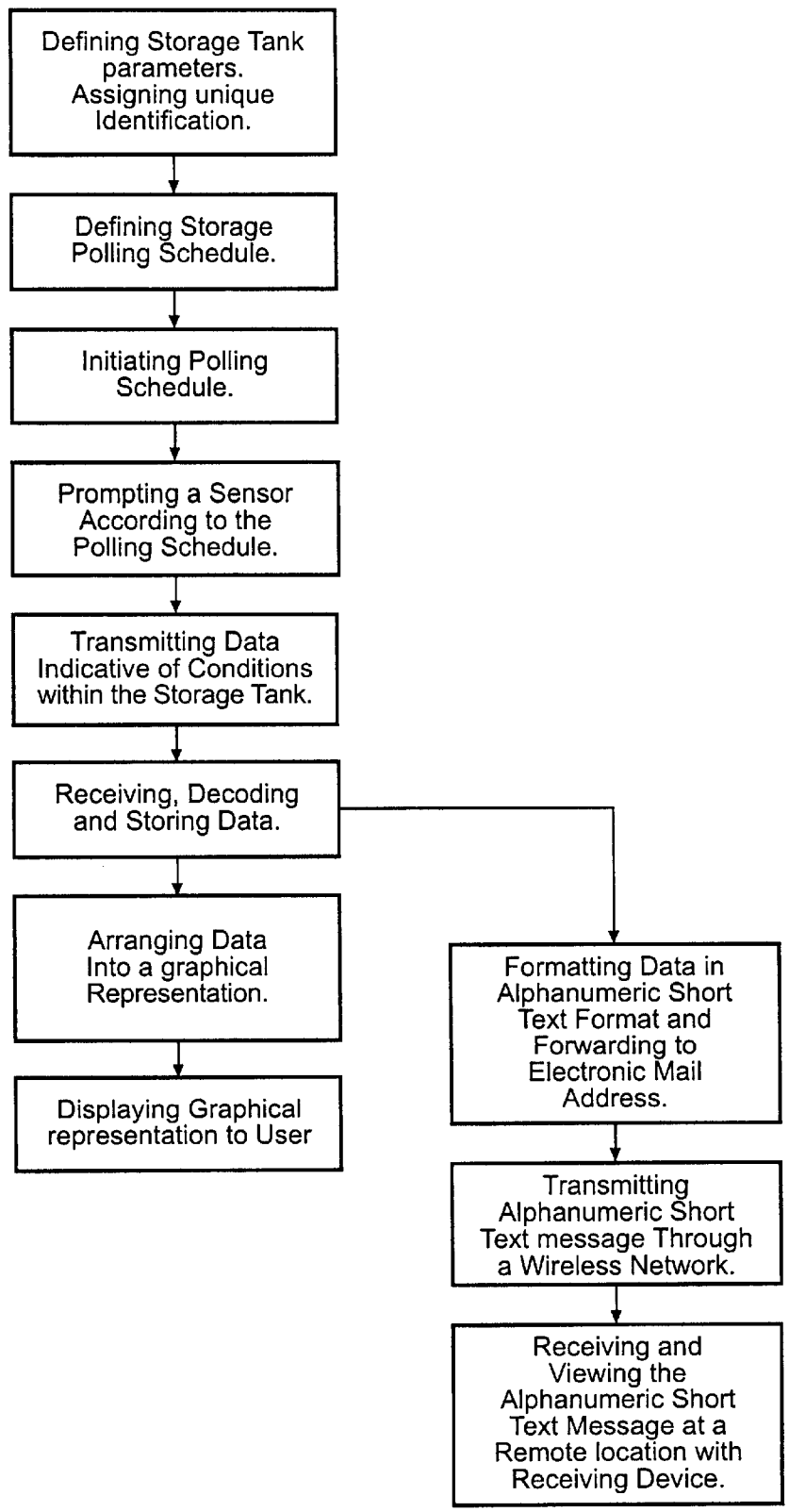
FIG. 3 is a block diagram of the method steps.

Referring to FIG. 3, a block diagram is shown representing the method steps comprising the method of monitoring conditions within the storage tank 12. The method includes the preliminary step of defining a specific storage tank 12 and assigning that storage tank 12 a unique identification. The method continues by defining the polling schedule for the storage tank 12 to prompt the sensor 14 to transmit data at specific times. A user initiates the polling schedule such that the base controller 16 prompts the sensor 14 at the storage tank 12. The sensor 14 transmits data indicative of the fluid level and temperature within the storage tank 12 to the base controller 16. The base controller 16 receives, decodes and stores the data in a database.

The method continues by arranging data received into one of two formats for viewing by a user. The first format is the graphical representation of the storage tank 12 displayed to user as shown in FIG. 2. The second format is an alphanumeric short text message sent by way of the internet to an electronic mail address for forwarding over a wireless communications network 24 to a receiving device, preferably a cell phone 26. Although a cell phone 26 is preferred, it is within the contemplation of this invention to transmit data to other receiving devices capable of receiving wireless alphanumeric message, such as personal digital assistances, and pagers.

The invention has been described in an illustrative manner, and should be understood that the terminology used is intended to be in the nature of words of description rather than of limitation. It is understood that a worker skilled in the art would understand that the scope of the appended claims; the invention may be practiced otherwise than as specifically described. For that reason the following claims should be studied to determine the true scope and content of this invention.

What is claimed is:

1. A method of monitoring conditions within a storage tank, the method including the steps of:
   a. sensing conditions within the storage tank with a sensor;
   b. positioning the sensor within the storage tank and a cellular modem in proximity and in communication with the sensor, the storage tank being located within a tank storage area;
   c. sending data indicative of conditions within the storage tank from the sensor to the cellular modem;
   d. sending the data indicative of conditions within the storage tank from the cellular modem to a base controller, wherein the base controller is located remotely and outside of the tank storage area;
   e. predefining a tank configuration with the base controller;
   f. using the data to recall the tank configuration;
   g. preparing a graphical representation of conditions within the storage tank for viewing and using the data and tank configuration to generate the graphical configuration; and
   h. displaying the graphical representation to provide information on conditions within the storage tank.

2. The method of claim 1, further including the step of transmitting the data from the base controller over a communications network to a remote user.

3. The method of claim 1, wherein step (c) is further defined by sending data indicative of conditions within the storage tank in response to a prompt signal sent from the base controller.

4. The method of claim 3, wherein the method further includes the step of predefining a polling schedule and automatically sending a prompt signal from the base controller based on the predefined polling schedule.

5. The method of claim 4, wherein the polling schedule includes definitions for automatically transmitting data over the communications network to a remote user.

6. The method of claim 5, wherein the communication network transmits the data over a wireless connection to a display device.

7. The method of claim 1, wherein the graphical representation includes a representation of the storage tank configuration and fluid level.

8. The method of claim 1, wherein the graphical representation further includes a representation of the total volume capacity of fluid able to be stored within the storage tank, the current volume of fluid, and the current available volume within the storage tank.

9. The method of claim 1, wherein a graph is provided along with the graphical representation to communicate previous levels of fluid within the storage tank.

10. The method of claim 1, wherein a table of data is provide along with the graphical representation to communicate numerical data gathered from the sensor.

11. The method of claim 1, wherein the graphical representation includes the time that data represented by the graphical representation was obtained from the sensor and the temperature of the fluid within the storage tank.

12. A system for monitoring conditions within a storage tank comprising;
   a sensor for sensing conditions within the storage tank;
   a cellular modem in proximate communication with the sensor for transmitting data indicative of the conditions within the storage tank;
   a communication network through which data from the sensor is communicated to a base controller; the base controller including a decoding means to translate the data, a storage means to store the data, and a transmitter to forward data;
   a graphical representation of data transmitted from the sensor to communicate the conditions within a storage tank tailored to the specific storage tank configuration, wherein the specific tank storage configuration is definable by a unique identifier, and the graphical representation is displayable upon a recall of the unique identifier upon receipt of data indicative of the conditions within the storage tank, and
   a remote display device to receive data sent from the base controller through the communication network.

13. The system of claim 12, wherein the communications network includes a wireless network and the remote display device is a cellular phone such that said the data transmitted over the communications network is displayed as an alphanumeric message on the cellular phone.

14. The system of claim 12, wherein the data is transmitted by the base controller to the display device according to a predetermined polling schedule.

15. The system of claim 12, wherein the graphical representation includes a graphical representation of the storage tank configuration.

16. The system of claim 12, wherein the graphical representation includes a representation of the fluid level within the storage tank.

17. The system of claim 12, wherein the graphical representation includes calculated volumes of fluid stored within the storage tank.

18. A method of monitoring conditions within a storage tank, the method including the steps of:
   a. positioning a sensor within the storage tank, the storage tank being located within a storage tank area;
   b. sensing conditions within the storage tank with the sensor;
   c. sending data indicative of conditions within the storage tank from the sensor to a cellular modem;
   d. sending the data indicative of conditions within the storage tank from the cellular modem to a base controller, wherein the base controller is located remotely and outside of the tank area;
   e. receiving, decoding and storing the data at the base controller;
   f. detecting a unique identifier within the data;
   g. using the unique identifier to recall a predefined storage tank configuration;
   h. displaying a graphical representation of the conditions within the storage tank by using the unique identifier to recall the predefined storage tank configuration;
   i. transmitting the data from the base controller over a communications network to a remote user, and
   j. viewing the data on a wireless display device.

19. The method of claim 18, wherein step is further defined by the communications transmitting the data over a wireless connection to a display device.

20. The method of claim 18, wherein step is further defined by sending data indicative of conditions within the storage tank in response to a prompt signal sent from the base controller.

21. The method of claim 18, wherein the method further includes the step of defining a polling schedule and automatically sending a prompt signal from the base controller based on the defined polling schedule.

22. The method of claim 21, wherein the polling schedule includes definitions for automatically transmitting data over the communications network to a remote user.

23. A system for monitoring conditions within a storage tank comprising;
   a sensor for sensing conditions within the storage tank within a tank area;
   a cellular modem in proximate communication with the sensor for transmitting data indicative of the conditions within the storage tank;
   a communication network through which the data from the sensor is communicated;
   a base controller; comprising a decoding means for interpreting the data and detecting a unique identifier within the data, a storage means for storing the data, and a transmitter for forwarding the data through a wireless network, wherein the base controller is operative for using the unique identifier to recall a predefined storage tank configuration and for displaying a graphical representation of the conditions within the storage tank by using the unique identifier to recall the predefined storage tank configuration from the storage means; and
   a remote display device for receiving the data forwarded from the base controller through the wireless network.

24. The system of claim 23, wherein the communications network and the remote display device is a cellular phone such that the data transmitted over the communications network is displayed as an alphanumeric message on the cellular phone.

25. The system of claim 23, wherein the data is transmitted by the base controller to the display device according to a predetermined polling schedule.

* * * * *